(12) United States Patent
Lee et al.

(10) Patent No.: US 10,654,959 B2
(45) Date of Patent: *May 19, 2020

(54) METHOD FOR PREPARING SUPERABSORBENT POLYMER

(71) Applicant: LG Chem, Ltd., Seoul (KR)

(72) Inventors: Soo Jin Lee, Daejeon (KR); Hye Mi Nam, Daejeon (KR); Sang Gi Lee, Daejeon (KR); Min Ho Hwang, Daejeon (KR); Tae Hwan Jang, Daejeon (KR)

(73) Assignee: LG Chem, Ltd. (KR)

( * ) Notice: Subject to any disclaimer, the term of this patent is extended or adjusted under 35 U.S.C. 154(b) by 133 days.

This patent is subject to a terminal disclaimer.

(21) Appl. No.: 15/554,852

(22) PCT Filed: Apr. 11, 2016

(86) PCT No.: PCT/KR2016/003793
§ 371 (c)(1),
(2) Date: Aug. 31, 2017

(87) PCT Pub. No.: WO2017/026623
PCT Pub. Date: Feb. 16, 2017

(65) Prior Publication Data
US 2018/0037686 A1 Feb. 8, 2018

(30) Foreign Application Priority Data
Aug. 13, 2015 (KR) .................. 10-2015-0114870

(51) Int. Cl.
*C08F 220/06* (2006.01)
*C08J 3/075* (2006.01)
*C08J 3/24* (2006.01)
*C08F 2/10* (2006.01)

(52) U.S. Cl.
CPC .............. *C08F 220/06* (2013.01); *C08F 2/10* (2013.01); *C08J 3/075* (2013.01); *C08J 3/24* (2013.01)

(58) Field of Classification Search
None
See application file for complete search history.

(56) References Cited

U.S. PATENT DOCUMENTS

| | | | |
|---|---|---|---|
| 4,883,478 A | 11/1989 | Lerailler et al. | |
| 4,973,632 A | 11/1990 | Nagasuna et al. | |
| 5,032,628 A | 7/1991 | Choi et al. | |
| 5,118,719 A | 6/1992 | Lind | |
| 5,328,935 A | 7/1994 | Van Phan et al. | |
| 5,563,218 A | 10/1996 | Rebre et al. | |
| 5,712,316 A | 1/1998 | Dahmen et al. | |
| 5,985,944 A * | 11/1999 | Ishizaki | A61L 15/425 521/64 |
| 6,107,358 A | 8/2000 | Harada et al. | |
| 6,133,193 A | 10/2000 | Kajikawa et al. | |
| 6,174,929 B1 | 1/2001 | Hahnle et al. | |
| 6,414,214 B1 | 7/2002 | Engelhardt et al. | |
| 6,565,768 B1 | 5/2003 | Dentler et al. | |
| 6,750,262 B1 | 6/2004 | Hahnle et al. | |
| 7,638,570 B2 | 12/2009 | Torii et al. | |
| 2001/0038831 A1 | 11/2001 | Park et al. | |
| 2004/0019342 A1 | 1/2004 | Nagasuna et al. | |
| 2004/0214946 A1 | 10/2004 | Smith et al. | |
| 2005/0054784 A1 | 3/2005 | Qin et al. | |
| 2005/0137546 A1 | 6/2005 | Joy et al. | |
| 2005/0256469 A1 | 11/2005 | Qin et al. | |
| 2006/0204755 A1 * | 9/2006 | Torii | A61L 15/60 428/402 |
| 2007/0066167 A1 | 3/2007 | Wada et al. | |
| 2007/0123658 A1 | 5/2007 | Torii et al. | |
| 2007/0141338 A1 | 6/2007 | Ishizaki et al. | |
| 2008/0058747 A1 | 3/2008 | Singh Kainth et al. | |

(Continued)

FOREIGN PATENT DOCUMENTS

| | | |
|---|---|---|
| CN | 1856331 A | 11/2006 |
| CN | 101094696 A | 12/2007 |

(Continued)

OTHER PUBLICATIONS

Extended European Search Report including Written Opinion for Application No. EP16835267.2 dated Aug. 22, 2018.
Lee at al., U.S. Appl. No. 15/564,487, filed Oct. 5, 2017, titled "Super Absorbent Polymer".
Odian, George, "Principles of Polymerization." Second Edition, Copyright 1981, p. 203.
Schwalm, Reinhold, "UV Coatings: Basics, Recent Developments and New Applications." Elsevier Science, Dec. 21, 2006, p. 115.
Search report from International Application No. PCT/KR2016/006202, dated Sep. 12, 2016.
Kabiri, K., et al.., "Novel approach to highly porous superabsorbent hydrogels: synergistic effect of porogens on porosity and swelling rate." Polymer International, vol. 52, Jan. 7, 2003, pp. 1158-1164.

(Continued)

*Primary Examiner* — Hui H Chin
(74) *Attorney, Agent, or Firm* — Lerner, David, Littenberg, Krumholz & Mentlik, LLP

(57) ABSTRACT

The present invention provides a method for preparing a superabsorbent polymer, the method comprising the steps of: forming a function gel polymer by cross-linked polymerization of a monomer mixture under the presence of an internal cross-linking agent, the monomer mixture including a water-soluble ethylene-based unsaturated monomer having an acid group at least part of which is neutralized, a carbonate, a volatile organic solvent, a surfactant, and a bubble promoting agent; forming a base resin powder by drying, grinding, and classifying the function gel polymer; and forming a surface cross-linked layer by additional cross-linking of the surface of the base resin powder under the presence of a surface cross-linking agent. The method for preparing a superabsorbent polymer may provide a superabsorbent polymer which has a porous structure, thereby exhibiting an excellent absorption rate while exhibiting excellent gel strength.

12 Claims, 3 Drawing Sheets

(56) References Cited

U.S. PATENT DOCUMENTS

| | | |
|---|---|---|
| 2008/0139693 A1 | 6/2008 | Ikeuchi et al. |
| 2008/0161499 A1 | 7/2008 | Riegel et al. |
| 2008/0215026 A1 | 9/2008 | Schornick et al. |
| 2008/0234645 A1 | 9/2008 | Dodge et al. |
| 2009/0196848 A1 | 8/2009 | Davis |
| 2010/0057027 A1 | 3/2010 | Furno et al. |
| 2010/0099781 A1 | 4/2010 | Tian et al. |
| 2011/0204288 A1 | 8/2011 | Funk et al. |
| 2011/0313113 A1 | 12/2011 | Sakamoto et al. |
| 2012/0045639 A1 | 2/2012 | Whitmore et al. |
| 2012/0184670 A1 | 7/2012 | Kobayashi et al. |
| 2012/0184684 A1 | 7/2012 | Funk et al. |
| 2012/0219728 A1 | 8/2012 | Badri et al. |
| 2012/0232177 A1 | 9/2012 | Lopez Villanueva et al. |
| 2012/0258851 A1 | 10/2012 | Nakatsuru et al. |
| 2012/0296296 A1 | 11/2012 | Di Cintio et al. |
| 2012/0296297 A1 | 11/2012 | Di Cintio et al. |
| 2012/0296298 A1 | 11/2012 | Gray et al. |
| 2012/0296299 A1 | 11/2012 | Villanueva et al. |
| 2012/0309619 A1 | 12/2012 | Kwon et al. |
| 2013/0102750 A1* | 4/2013 | Watanabe ............... C08F 6/008 526/318.41 |
| 2013/0172180 A1 | 7/2013 | Naumann et al. |
| 2014/0066584 A1 | 3/2014 | Peterson et al. |
| 2014/0127510 A1 | 5/2014 | Handa et al. |
| 2014/0296423 A1 | 10/2014 | Ebata et al. |
| 2014/0306155 A1 | 10/2014 | Tian et al. |
| 2014/0306156 A1 | 10/2014 | Tian et al. |
| 2014/0312273 A1 | 10/2014 | Wattebled et al. |
| 2014/0364824 A1 | 12/2014 | Ota et al. |
| 2015/0011388 A1 | 1/2015 | Matsumoto et al. |
| 2015/0087742 A1 | 3/2015 | Won et al. |
| 2015/0093575 A1 | 4/2015 | Naumann et al. |
| 2015/0129799 A1 | 5/2015 | Kobayashi et al. |
| 2015/0137546 A1 | 5/2015 | Gaudig |
| 2015/0283284 A1 | 10/2015 | Azad et al. |
| 2016/0108227 A1 | 4/2016 | Wattebled et al. |
| 2016/0151531 A1 | 6/2016 | Lee et al. |
| 2016/0184799 A1 | 6/2016 | Lee et al. |
| 2018/0037686 A1 | 2/2018 | Lee et al. |
| 2018/0050321 A1 | 2/2018 | Lee et al. |
| 2018/0056274 A1 | 3/2018 | Lee et al. |
| 2018/0079847 A1 | 3/2018 | Nam et al. |
| 2018/0265645 A1 | 9/2018 | Nam et al. |
| 2018/0265646 A1 | 9/2018 | Nam et al. |

FOREIGN PATENT DOCUMENTS

| | | |
|---|---|---|
| CN | 101133100 A | 2/2008 |
| CN | 102197057 A | 9/2011 |
| CN | 102666670 A | 9/2012 |
| CN | 102762616 A | 10/2012 |
| CN | 103179931 A | 6/2013 |
| CN | 104024291 A | 9/2014 |
| CN | 104284921 A | 1/2015 |
| CN | 104603159 A | 5/2015 |
| EP | 0555692 A1 | 8/1993 |
| EP | 0615736 A1 | 9/1994 |
| EP | 0644211 A1 | 3/1995 |
| EP | 0744435 A1 | 11/1996 |
| EP | 1400556 A1 | 3/2004 |
| EP | 1637105 A1 | 3/2006 |
| EP | 1730218 B1 | 12/2010 |
| EP | 3248990 A1 | 11/2017 |
| EP | 3260485 A1 | 12/2017 |
| EP | 2797566 B1 | 6/2019 |
| JP | H06313042 A | 11/1994 |
| JP | H09124879 A | 5/1997 |
| JP | H10139916 A | 5/1998 |
| JP | H10251309 A | 9/1998 |
| JP | H11156188 A | 6/1999 |
| JP | 2005154758 A | 6/2005 |
| JP | 2006116535 A | 5/2006 |
| JP | 20070012623 A | 1/2007 |
| JP | 3913867 B2 | 5/2007 |
| JP | 2007314794 A | 12/2007 |
| JP | 2009227885 A | 10/2009 |
| JP | 2011511086 A | 4/2011 |
| JP | 5336704 B2 | 11/2013 |
| JP | 2014098172 A | 5/2014 |
| JP | 2014514128 A | 6/2014 |
| JP | 2014514432 A | 6/2014 |
| JP | 2014518716 A | 8/2014 |
| JP | 2014523452 A | 9/2014 |
| JP | 2015503655 A | 2/2015 |
| JP | 2015150059 A | 8/2015 |
| JP | 2015213911 A | 12/2015 |
| KR | 910008293 B1 | 10/1991 |
| KR | 930007272 B1 | 8/1993 |
| KR | 100269980 B1 | 10/2000 |
| KR | 20050022813 A | 3/2005 |
| KR | 20060015498 A | 2/2006 |
| KR | 20060023116 A | 3/2006 |
| KR | 20090042828 A | 4/2009 |
| KR | 20090123904 A | 12/2009 |
| KR | 20110092236 A | 8/2011 |
| KR | 20120102088 A | 9/2012 |
| KR | 20130120300 A | 11/2013 |
| KR | 20140054324 A | 5/2014 |
| KR | 20140056225 A | 5/2014 |
| KR | 20140094536 A | 7/2014 |
| KR | 20140095569 A | 8/2014 |
| KR | 20140102264 A | 8/2014 |
| KR | 20140107347 A | 9/2014 |
| KR | 20150016126 A | 2/2015 |
| KR | 20150040476 A | 4/2015 |
| KR | 20150116418 A | 10/2015 |
| KR | 20150143624 A | 12/2015 |
| KR | 101582241 B1 | 1/2016 |
| KR | 20160010517 A | 1/2016 |
| WO | 87003208 A1 | 6/1987 |
| WO | 2004096304 A1 | 11/2004 |
| WO | 2005027986 A1 | 3/2005 |
| WO | 2006069732 A1 | 7/2006 |
| WO | 2011026876 A1 | 3/2011 |
| WO | 2014167040 A1 | 10/2014 |
| WO | 2014168858 A1 | 10/2014 |
| WO | 2014168871 A1 | 10/2014 |

OTHER PUBLICATIONS

Kabiri, Kourosh, et al. "Porous Superabsorbent Hydrogel Composites: Synthesis, Morphology and Swelling Rate." Macromolecular Materials and Engineering, Apr. 20, 2004, vol. 289, pp. 653-661.

Odian, George, "Principle of Polymerization." Second Edition, (Wiley, 1981), p. 203.

Schwalm, Reinhold, "UV Coatings: Basics, Recent Developments and New Applications." Elservier Science, Dec. 21, 2016, p. 115.

Search report from International Application No. PCT/KR2016/003793, dated Dec. 22, 2016.

Search report from International Application No. PCT/KR2016/003946, dated Jul. 29, 2016.

Search report from International Application No. PCT/KR2016/003948, dated Jul. 27, 2016.

Search report from International Application No. PCT/KR2016/005809, dated Aug. 24, 20116.

Search report from International Application No. PCT/KR2016/013286, dated Mar. 6, 2017.

U.S. Appl. No. 15/556,078, filed Sep. 6, 2017.
U.S. Appl. No. 15/556,083, filed Sep. 6, 2017.
U.S. Appl. No. 15/556,740, filed Sep. 8, 2017.
U.S. Appl. No. 15/558,429, filed Sep. 14, 2017.

Extended European Search Report including Written Opinion for Application No. EP16803731.5 dated Sep. 3, 2018.

Extended European Search Report including Written Opinion for Application No. EP16811803.2 dated Aug. 27, 2018.

Third Party Observation for Application No. EP16890123.9 dated Jul. 10, 2018.

Third Party Observation for Application No. PCT/KR2016/013286 dated Jun. 25, 2018.

(56) References Cited

OTHER PUBLICATIONS

Third Party Observation for PCT/KR2016/006202 dated Oct. 16, 2017.
Extended European Search Report including Written Opinion for Application No. EP16890123.9 dated Sep. 7, 2018.
Third Party Observation for Application No. PCT/KR2016/003946 dated Oct. 31, 2017.
Third Party Observation for Application No. PCT/KR2016/003948 dated Oct. 13, 2017.
Third Party Observation for PCT/KR2016/005809 dated Sep. 29, 2017.
Third Party Observation for Application No. 16811871.9 dated Jan. 3, 2020, 7 pages.
Buchholz, et al., Modern Superabsorbent Polymer Technology, 1998, vol. 152, pp. 199-201, New York: Wiley-vch.
Third Party Observation for Application No. 16890123.9 dated Jan. 3, 2020, 4 pages.

* cited by examiner

[FIG. 1]
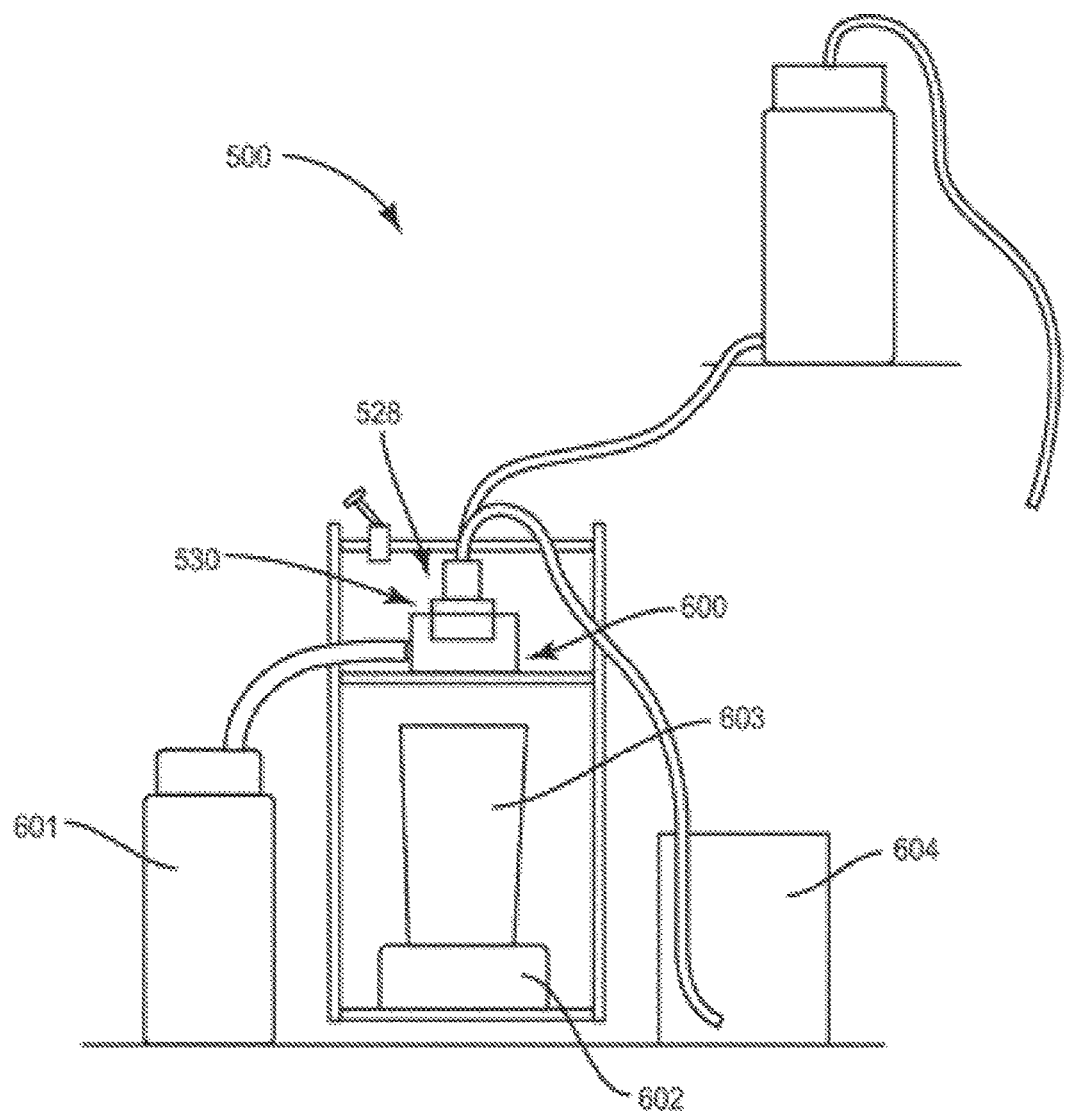

[FIG. 2]
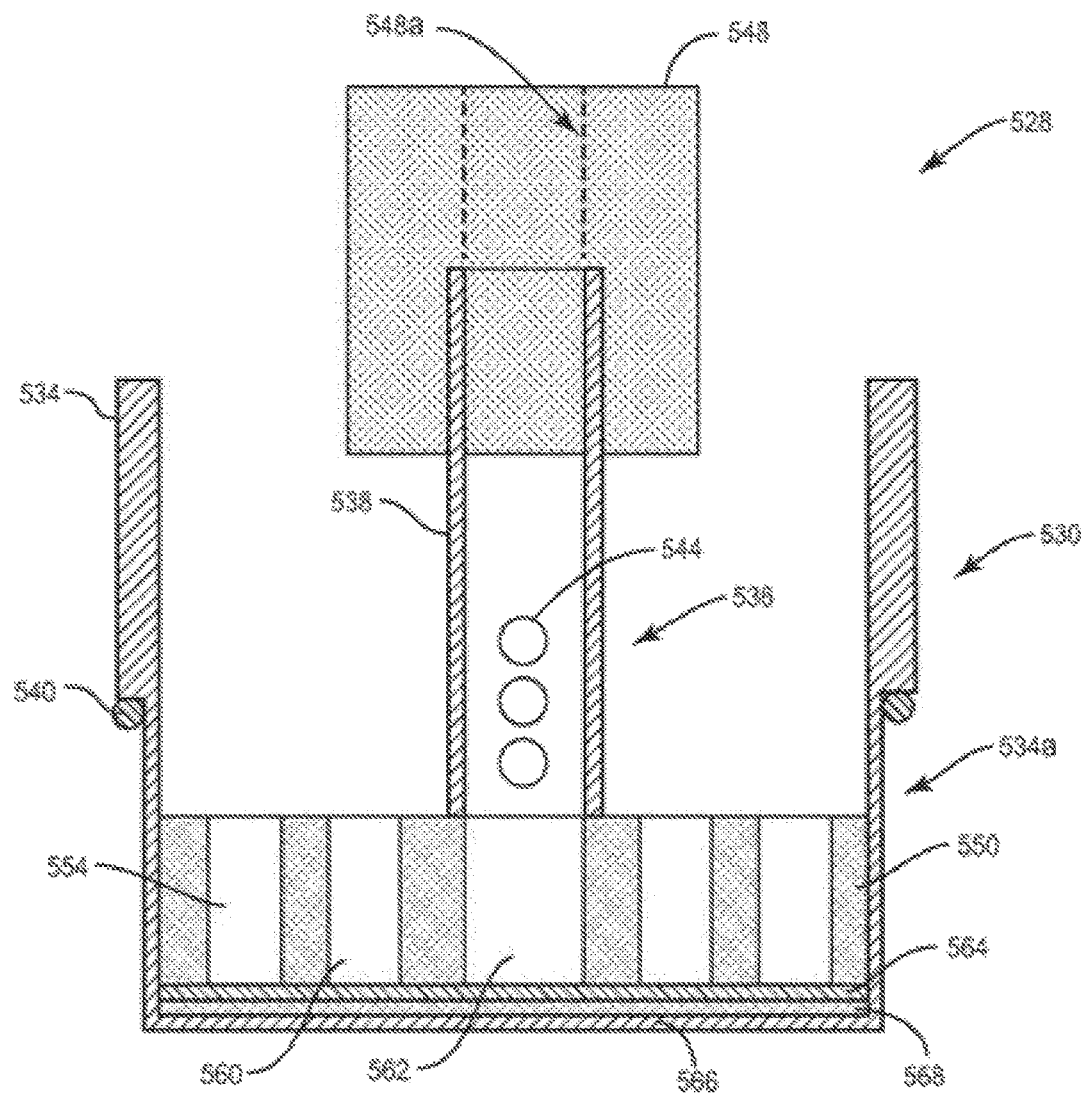

[FIG. 3]
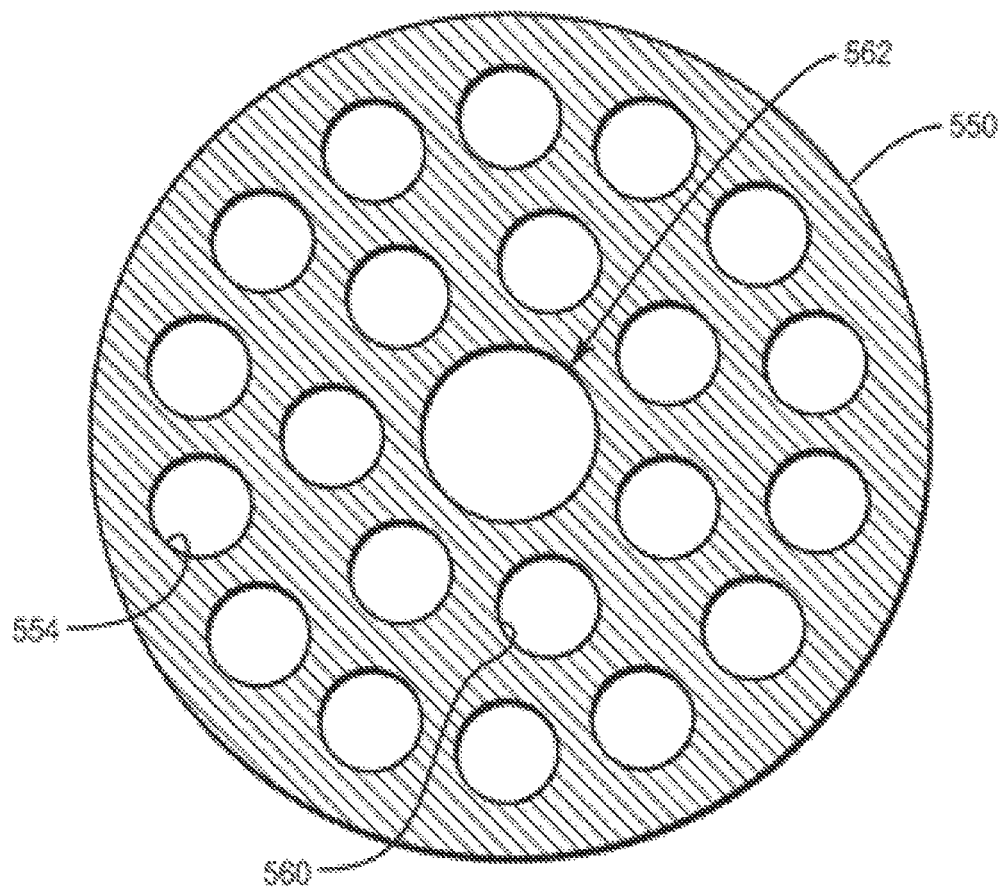

METHOD FOR PREPARING SUPERABSORBENT POLYMER

CROSS-REFERENCE TO RELATED APPLICATION

The present application is a national phase entry under 35 U.S. C. § 371 of International Application No. PCT/KR2016/003793, filed Apr. 11, 2016, published in Korean, which claims priority from, Korean Patent Application No. 10-2015-0114870, filed Aug. 13, 2015, in the Korean Intellectual Property Office, the disclosures of which are incorporated herein by reference.

TECHNICAL FIELD

The present invention relates to a method of preparing a superabsorbent polymer having a porous structure and showing excellent gel strength.

BACKGROUND ART

A superabsorbent polymer (SAP) is a synthetic polymeric material capable of absorbing moisture from about 500 to 1000 times its own weight. Various manufacturers have denominated it as different names, such as SAM (Super Absorbency Material), AGM (Absorbent Gel Material), etc. Since such superabsorbent polymers started to be practically applied in sanitary products, now they have been widely used not only for hygiene products such as disposable diapers for children, sanitary napkins, etc., but also for water retaining soil products for gardening, water stop materials for the civil engineering and construction, sheets for raising seedling, fresh-keeping agents for food distribution fields, materials for poultice, etc.

In most cases, these superabsorbent polymers have been widely used in the field of hygienic materials such as diapers, sanitary napkins, etc. For these applications, the superabsorbent polymers are required to exhibit a high absorption rate with respect to moisture, etc., and also required to exhibit an absorption rate above a predetermined level even under an external pressure or in a partially swollen state.

Therefore, in order to improve the absorption rate of superabsorbent polymers, studies have been continued on a technology of increasing the absorption surface area of superabsorbent polymers.

As a method of improving the absorption rate by increasing the absorption surface area of superabsorbent polymers, a method of forming many pores inside the superabsorbent polymer to rapidly absorb water or a method of preparing the superabsorbent polymer as small particles to improve a contact surface area with water may be considered.

As the former method, a method of preparing a superabsorbent polymer by using a foaming agent, etc. was suggested, but bubbles generated by the foaming agent were not sufficiently included inside the superabsorbent polymer, and it was very difficult to control a size of the pore formed inside the superabsorbent polymer by the known method.

Further, the superabsorbent polymer prepared by the known method had a slightly improved absorption rate due to a porous structure, but the porous structure formed by the known method had weak gel strength, and thus there were problems that absorbency under load and liquid permeability were deteriorated. That is, when the former method was used, a desired level of absorption rate could not be achieved, and it was difficult to provide a superabsorbent polymer having predetermined levels of physical properties.

Meanwhile, since there is a technical limitation in controlling the superabsorbent polymer to have a small particle size, the latter method may not sufficiently increase the absorption surface area of the superabsorbent polymer. Accordingly, there is a demand for studies to increase the absorption surface area of the superabsorbent polymer while maintaining physical properties thereof.

DISCLOSURE

Technical Problem

The present invention provides a method of preparing a superabsorbent polymer having a porous structure and showing excellent gel strength.

Technical Solution

According to an embodiment of the present invention, provided is a method of preparing a superabsorbent polymer, the method including the steps of: performing crosslinking polymerization of a monomer mixture in the presence of an internal crosslinking agent to form a water-containing gel polymer, the monomer mixture including water-soluble ethylene-based unsaturated monomers having acidic groups which are at least partially neutralized, a carbonate, a volatile organic solvent, a surfactant, and a foam promoter; drying, pulverizing, and size-sorting the water-containing gel polymer to form a base polymer powder; and additionally crosslinking the surface of the base polymer powder in the presence of a surface crosslinking agent to form a surface-crosslinked layer.

The preparation method according to an embodiment may provide a superabsorbent polymer of a porous structure showing excellent gel strength by using both the carbonate and the volatile organic solvent as foaming agents. The carbonate which is one of the foaming agents may be one or more selected from the group consisting of magnesium carbonate, calcium carbonate, sodium bicarbonate, sodium carbonate, potassium bicarbonate, and potassium carbonate. The volatile organic solvent which is the other of the foaming agents may be an organic solvent having a boiling point of 15° C. to 80° C. More specifically, a constitutional isomer of pentane, a constitutional isomer of hexane, acetone, methanol, ethanol, or a mixture thereof may be used as the volatile organic solvent.

The volatile organic solvent and the carbonate used as the foaming agents may be used in an amount of 0.001% by weight to 0.5% by weight with respect to a total weight of the monomer mixture, respectively, thereby providing a superabsorbent polymer of a porous structure showing excellent gel strength.

Particularly, the preparation method according to an embodiment may achieve the porous structure showing excellent gel strength by using a surfactant and a foam promoter, together with the above-described foaming agent.

In the preparation method, the surfactant may be used in an amount of 0.00001% by weight to 0.00100% by weight with respect to the total weight of the monomer mixture.

An inorganic acid aluminum salt and/or an organic acid aluminum salt may be used as the foam promoter. The foam promoter may be used in an amount of 0.001% by weight to 1% by weight with respect to the total weight of the monomer mixture.

The monomer mixture including these components may be polymerized by a thermal polymerization method for pore formation of the polymer which is caused by vaporization of the volatile organic solvent. In this regard, the monomer mixture may be subjected to crosslinking polymerization in a temperature range of about 40° C. to about 90° C. for sufficient vaporization of the volatile organic solvent and effective polymerization of monomers.

Meanwhile, in the step of forming the surface-crosslinked layer, one or more polyols selected from the group consisting of ethylene glycol, propylene glycol, 1,4-butanediol, 1,6-hexanediol, 1,2-hexanediol, 1,3-hexanediol, 2-methyl-1,3-propanediol, 2-methyl-1,3-pentanediol, 2-methyl-2,4-pentanediol, tripropylene glycol, and glycerol; or one or more carbonate-based compounds selected from the group consisting of ethylene carbonate and propylene carbonate may be used as the surface crosslinking agent.

The surface crosslinking agent may be used in an amount of 0.01% by weight to 3% by weight with respect to a total weight of the base polymer powder.

Further, in the step of forming the surface-crosslinked layer, the surface-crosslinked layer may be formed in the presence of one or more inorganic materials of silica, clay, alumina, a silica-alumina composite, titania, zinc oxide, and aluminum sulfate.

In the step of forming the surface-crosslinked layer, the surface-crosslinked layer may be formed at a temperature of 100° C. to 250° C.

The superabsorbent polymer provided by the preparation method according to an embodiment may exhibit characteristics of excellent centrifuge retention capacity, absorbency under load, liquid permeability, etc. due to the porous structure showing excellent gel strength. More specifically, the superabsorbent polymer may exhibit characteristics that centrifuge retention capacity (CRC) in a physiological saline solution is 29 g/g to 35 g/g, absorbency under load (AUL) of 0.9 psi in the physiological saline solution is 17 g/g to 21 g/g, a vortex time is 30 seconds to 50 seconds, and absorbency under load (0.3 psi gel AUL) of the superabsorbent polymer, as measured after swelling the superabsorbent polymer in the physiological saline solution under a load of 0.3 psi for 5 minutes and removing residual liquid under vacuum, is 18 g/g to 21 g/g.

Effect of the Invention

A method of preparing a superabsorbent polymer according to an embodiment of the present invention may provide a superabsorbent polymer which has a porous structure while showing excellent gel strength, thereby showing a high absorption rate. This superabsorbent polymer is characterized in that it is excellent in all physical properties such as centrifuge retention capacity, absorbency under load, liquid permeability, etc.

BRIEF DESCRIPTION OF DRAWINGS

FIGS. 1 to 3 are schematic views of an exemplary apparatus for measuring gel bed permeability and components provided in the apparatus.

DETAILED DESCRIPTION OF THE EMBODIMENTS

Hereinafter, a method of preparing a superabsorbent polymer according to a specific embodiment of the present invention and a superabsorbent polymer prepared thereby will be described.

According to an embodiment of the present invention, provided is a method of preparing a superabsorbent polymer, the method including the steps of: performing crosslinking polymerization of a monomer mixture in the presence of an internal crosslinking agent to form a water-containing gel polymer, the monomer mixture including water-soluble ethylene-based unsaturated monomers having acidic groups which are at least partially neutralized, a carbonate, a volatile organic solvent, a surfactant, and a foam promoter; drying, pulverizing, and size-sorting the water-containing gel polymer to form a base polymer powder; and additionally crosslinking the surface of the base polymer powder in the presence of a surface crosslinking agent to form a surface-crosslinked layer.

Experimental results of the present inventors confirmed that when the carbonate and the volatile organic solvent as foaming agents are used together with the surfactant and the foam promoter in the foam polymerization of a superabsorbent polymer, a porous superabsorbent polymer showing excellent gel strength may be provided, thereby completing the present invention. The superabsorbent polymer prepared according to the preparation method of an embodiment may exhibit a remarkably improved absorption rate due to improved absorption area while showing superior absorbency under load and liquid permeability due to excellent gel strength.

Hereinafter, the method of preparing the superabsorbent polymer according to an embodiment will be described in more detail.

In the preparation method according to an embodiment, as the water-soluble ethylene-based unsaturated monomer, one or more selected from the group consisting of an anionic monomer such as acrylic acid, (meth)acrylic acid, maleic anhydride, fumaric acid, crotonic acid, itaconic acid, 2-acryloylethane sulfonic acid, 2-methacryloylethane sulfonic acid, 2-(meth)acryloylpropane sulfonic acid, or 2-(meth)acrylamide-2-methyl propane sulfonic acid, and salts thereof; a nonionic hydrophilic monomer such as (meth)acrylamide, N-substituted (meth)acrylate, 2-hydroxyethyl (meth)acrylate, 2-hydroxypropyl(meth)acrylate, methoxy polyethylene glycol (meth)acrylate, or polyethylene glycol (meth)acrylate; and an amino group-containing unsaturated monomer such as (N,N)-dimethylaminoethyl(meth)acrylate or (N,N)-dimethylaminopropyl(meth)acrylamide, and a quaternary compound thereof may be used. Among them, acrylic acid or salts thereof, for example, acrylic acid which is at least partially neutralized, and/or alkali metal salts thereof such as sodium salts thereof may be used, and it is possible to prepare a superabsorbent polymer having superior physical properties by using these monomers. When the alkali metal salt of acrylic acid is used as the monomer, acrylic acid may be used after being neutralized with a basic compound such as caustic soda (NaOH). In this regard, a neutralization degree of the water-soluble ethylene-based unsaturated monomer may be controlled in the range of about 50 mol % to about 95 mol % or about 60 mol % to about 85 mol %. When the water-soluble ethylene-based unsaturated monomer is neutralized within the above range, it is possible to provide a superabsorbent polymer having excellent centrifuge retention capacity without concern about precipitation.

In the monomer mixture including the water-soluble ethylene-based unsaturated monomers, a concentration of the water-soluble ethylene-based unsaturated monomer may be about 20% by weight to about 60% by weight, or about 30% by weight to about 50% by weight with respect to a total weight of the monomer mixture including raw materials described below and a solvent, and the concentration may be properly controlled, in consideration of a polymerization time and reaction conditions. However, if the monomer concentration is too low, the yield of the superabsorbent polymer may become low and an economic problem may occur. On the contrary, if the concentration is too high, there is a process problem that a part of the monomers is precipitated, or pulverization efficiency is lowered upon pulverization of the polymerized water-containing gel polymer, and the physical properties of the superabsorbent polymer may be deteriorated.

In the preparation method according to an embodiment, crosslinking polymerization of the monomer mixture is performed in the presence of the foaming agent to form the water-containing gel polymer. Particularly, in the preparation method according to an embodiment, the carbonate and the volatile organic solvent are employed as foaming agents to provide a polymer showing excellent gel strength while having a porous structure.

More specifically, one or more selected from the group consisting of magnesium carbonate, calcium carbonate, sodium bicarbonate, sodium carbonate, potassium bicarbonate, and potassium carbonate may be used as the carbonate which is one of the foaming agents.

A solvent that is vaporized during crosslinking polymerization of the monomer mixture to form pores in the polymer may be used as the volatile organic solvent which is the other of the foaming agents. For example, an organic solvent having a boiling point of 15° C. to 80° C. may be used as the volatile organic solvent.

Specific examples of the volatile organic solvent may include a constitutional isomer of pentane (e.g., n-pentane (boiling point: 36.0° C.) and 2-methylbutane (boiling point: 27.7° C.)), a constitutional isomer of hexane (e.g., 2,3-dimethylbutane (boiling point: 58.0° C.), 2,2-dimethylbutane (boiling point: 49.7° C.)), acetone (boiling point: 56.5° C.), methanol (boiling point: 64.7° C.), ethanol (boiling point: 78.37° C.), etc. Any one of the organic solvents listed above or two or more thereof may be used as the volatile organic solvent.

In the monomer mixture including the water-soluble ethylene-based unsaturated monomers, etc., a concentration of the carbonate may be 0.001% by weight to 0.5% by weight with respect to the total weight of the monomer mixture and a concentration of the volatile organic solvent may be 0.001% by weight to 0.5% by weight with respect to the total weight of the monomer mixture.

When the concentrations of the carbonate and the volatile organic solvent are controlled within the above ranges, the pore size, porosity, etc. of the polymer may be optimized to remarkably improve the absorption surface area of the superabsorbent polymer. In addition, the polymer may exhibit excellent gel strength despite the porous structure thereof.

In particular, the carbonate and the volatile organic solvent may be used in a weight ratio of 1:1 to 1:2 to optimize the above-described effect, thereby achieving excellent absorbency under load and high absorption rate.

The superabsorbent polymer of the porous structure capable of showing the high gel strength may be achieved by using the foaming agent together with the surfactant and the foam promoter.

Various surfactants known in the art to which the present invention pertains may be used as the surfactant, as long as it is able to induce stable bubble formation of the foaming agent.

Non-limiting examples of the surfactant may include one or more surfactants of anionic surfactants, non-ionic surfactants, cationic surfactants, and amphoteric surfactants.

Specifically, specific examples of the anionic surfactants may include fatty acid salts such as mixed fatty acid sodium soap, fatty acid sodium soap of semi-cured milk fat, sodium stearate soap, potassium oleate soap, potassium soap of castor oil, etc.; alkyl sulfate ester salts such as sodium lauryl sulfate, sodium higher alcohol sulfate, triethanolamine lauryl sulfate, etc.; alkylbenzene sulfonate such as sodium dodecylbenzene sulfonate, etc.; alkyl naphthalene sulfonate such as sodium alkyl naphthalene sulfonate, etc.; alkyl sulfosuccinate such as sodium dialkyl sulfosuccinate, etc.; alkyl diphenyl ether disulfonate such as sodium alkyl diphenyl ether disulfonate, etc.; alkyl phosphate such as potassium alkyl phosphate, etc.; polyoxyethylene alkyl (or alkyl allyl) ester sulfate such as sodium polyoxyethylene lauryl ether sulfate, sodium polyoxyethylene alkyl ether sulfate, triethanolamine polyoxyethylene alkyl ether sulfate, sodium polyoxyethylene alkyl phenyl ether sulfate, etc.; special reaction-type anionic surfactants; special carboxylic acid-type surfactants; naphthalenesulfonic acid formalin condensates such as sodium salt of β-naphthalenesulfonic acid formalin condensate, sodium salt of special aromatic sulfonic acid formalin condensate, etc.; special polycarboxylic acid-type polymer surfactants; polyoxyethylene alkyl phosphate ester, etc. Specific examples of the non-ionic surfactant may include polyoxyethylene alkyl ethers such as polyoxyethylene lauryl ether, polyoxyethylene cetyl ether, polyoxyethylene stearyl ether, polyoxyethylene oleyl ether, polyoxyethylene higher alcohol ether, etc.; polyoxyethylene alkyl aryl ethers such as polyoxyethylene nonyl phenyl ether, etc.; polyoxyethylene derivatives; sorbitan fatty acid esters such as sorbitan monolaurate, sorbitan monopalmitate, sorbitan monostearate, sorbitan tristearate, sorbitan monooleate, sorbitan trioleate, sorbitan sesquioleate, sorbitan distearate, etc.; polyoxyethylene sorbitan fatty acid esters such as polyoxyethylene sorbitan monolaurate, polyoxyethylene sorbitan monopalmitate, polyoxyethylene sorbitan mono stearate, polyoxyethylene sorbitan tristearate, polyoxyethylene sorbitan monooleate, polyoxyethylene sorbitan trioleate, etc.; polyoxyethylene sorbitol fatty acid esters such as polyoxyethylene sorbitol tetraoleate; glycerin fatty acid esters such as glycerol monostearate, glycerol monooleate, self-emulsifying type glycerol monostearate, etc.; polyoxyethylene fatty acid esters such as polyethylene glycol monolaurate, polyethylene glycol monostearate, polyethylene glycol distearate, polyethylene glycol monooleate, etc.; polyoxyethylenealkyl amines; polyoxyethylene-cured castor oil; alkylalkanol amides, etc. Specific examples of the cationic surfactant and the amphoteric surfactant may include alkylamine salts such as coconut amine acetate, stearylamine acetate, etc.; quaternary ammonium salts such as lauryltrimethylammonium chloride, stearyltrimethylammonium chloride, cetyltrimethylammonium chloride, distearyldimethylammonium chloride, alkylbenzyldimethylammonium chloride, etc.; alkyl betaine such as lauryl betaine, stearyl betaine, lauryl carboxymethyl hydroxy ethylimidazolinium betaine, etc.; and amine oxides such as lauryl dimethyl amine oxide, etc.

In addition to the above-described surfactants, one or more of fluorine-based surfactants and organic metal surfactants may be used as the surfactant. The fluorine-based surfactants and the organic metal surfactants may act as anionic surfactants, non-ionic surfactants, cationic surfactants, and amphoteric surfactants, depending on the kind of hydrophilic groups. These surfactants may stably disperse bubbles in the monomer mixture for a long time.

Specific examples of the fluorine-based surfactants applicable may include fluoroalkyl(C2~C10) carboxylic acid, 3-[fluoroalkyl (C6~C11)oxy]-1-alkyl (C3~C4) sodium sulfonic acid, phosphoric acid bis(N-perfluorooctylsulfonyl-N-ethylaminoethyl), monoperfluoroalkyl(C6~C16) ethyl phosphoric acid ester, perfluoroalkyl quaternary ammonium iodide (commercial name: fluorad FC-134, cationic surfactant produced by Sumitomo 3M Ltd.), perfluoroalkyl alkoxylate (commercial name: fluorad FC-171, non-ionic surfactant produced by Sumitomo 3M Ltd.), perfluoroalkyl sulfonic acid potassium salt (commercial name: fluorad FC-95 and FC-98, anionic surfactant produced by Sumitomo 3M Ltd.), etc.

The organic metal surfactant refers to a compound containing an organic metal, such as Si, Ti, Sn, Zr, Ge, etc., in the main chain. Specific examples of the organic metal surfactant applicable may include polysiloxane containing polyether side chains which is a silicone-based surfactant. More specifically, polysiloxane containing polyether side chains, etc. may be used as the silicone-based surfactant. Among them, a silicone-based surfactant having a structure of a polydimethylsiloxane backbone with polyether sides chains such as poly(ethylene oxide) or poly(propylene oxide) may be used. Examples of the surfactant may include OFX-0190 Fluid (PEG/PPG-18/18 Dimethicone), OFX-0193 Fluid (PEG-12 Dimethicone), OFX-5220 Fluid (PEG/PPG-17/18 Dimethicone), OFX-5324 Fluid (PEG-12 Dimethicone) of Xiameter®, etc. When these silicone-based surfactants are employed as the surfactant, flowability of the superabsorbent polymer may be improved due to a lubricating action of the silicone-based surfactant.

In the monomer mixture, a concentration of the surfactant may be controlled from about 0.00001% by weight to about 0.00100% by weight with respect to the total monomer mixture. When the concentration of the surfactant may be controlled within the above range, stable bubble generation of the foaming agent may be induced, and bubbles in the monomer mixture may be stably dispersed for a long time.

A foam promoter capable of promoting bubble generation of the foaming agent to optimize the foaming degree may be used as the foam promoter. An inorganic acid aluminium salt such as aluminum sulfate, aluminum chloride, etc., or an organic acid aluminium salt such as aluminum lactate, aluminum oxalate, aluminum citrate, aluminum urate, etc. may be used as the foam promoter.

In the monomer mixture, a concentration of the foam promoter may be 0.001% by weight to 1% by weight with respect to the total monomer mixture. When the concentration of the foam promoter may be controlled within the above range to optimize the foaming degree, a superabsorbent polymer having a pore size and porosity at desired levels and showing excellent gel strength may be prepared.

As the internal crosslinking agent to introduce a basic crosslinked structure into the base polymer powder, any internal crosslinking agent having a crosslinkable functional group which has been generally used in the preparation of the superabsorbent polymer may be used without limitation. However, to further improve physical properties of the superabsorbent polymer by introducing a proper crosslinked structure into the base polymer powder, a multifunctional acrylate-based compound having a plurality of ethylene oxide groups may be used as the internal crosslinking agent. More specific examples of the internal crosslinking agent may include one or more selected from the group consisting of polyethylene glycol diacrylate (PEGDA), glycerin diacrylate, glycerin triacrylate, non-modified or ethoxylated trimethylol propane triacrylate (TMPTA), hexanediol diacrylate, and triethylene glycol diacrylate. The internal crosslinking agent may be included in an amount of about 0.01% by weight to about 0.5% by weight with respect to the monomer mixture, thereby crosslinking the polymerized polymer.

In addition, the monomer mixture may further include a polymerization initiator which is generally used in the preparation of the superabsorbent polymer. Specifically, in the preparation method according to an embodiment, a thermal polymerization method may be employed in order to prepare a porous polymer through vaporization of the volatile organic solvent. Therefore, the monomer mixture may further include a thermal polymerization initiator.

One or more selected from the group consisting of persulfate-based initiators, azo-based initiators, hydrogen peroxide, and ascorbic acid may be used as the thermal polymerization initiator. Specific examples of the persulfate-based initiators may include sodium persulfate ($Na_2S_2O_8$), potassium persulfate ($K_2S_2O_8$), ammonium persulfate (($NH_4$)$_2$$S_2O_8$), etc. Examples of the azo-based initiators may include 2,2-azobis(2-amidinopropane)dihydrochloride, 2,2-azobis-(N,N-dimethylene)isobutyramidine dihydrochloride, 2-(carbamoylazo)isobutylonitrile, 2,2-azobis(2-[2-imidazolin-2-yl]propane)dihydrochloride, 4,4-azobis-(4-cyanovaleric acid), etc. More various thermal polymerization initiators are well-disclosed in 'Principle of Polymerization (Wiley, 1981)' written by Odian, p 203, however, they are not limited to the above described examples.

The thermal polymerization initiator may be included in an amount of about 0.001% by weight to about 0.5% by weight with respect to the monomer mixture. If the concentration of the thermal polymerization initiator is too low, additional thermal polymerization hardly occurs, and thus the addition effect of the thermal polymerization initiator may not be sufficiently obtained. If the concentration of the thermal polymerization initiator is too high, the molecular weight of the superabsorbent polymer may become low and its physical properties may not be uniform.

Further, in the preparation method according to an embodiment, a polymerization method using both heat and light may be employed. Therefore, the monomer mixture may further include a photo-polymerization initiator.

As the photo-polymerization initiator, a compound capable of forming radicals by light such as UV may be used without limitations in the constitution.

For example, one or more selected from the group consisting of benzoin ether, dialkyl acetophenone, hydroxyl alkylketone, phenyl glyoxylate, benzyl dimethyl ketal, acyl phosphine, and α-aminoketone may be used as the photo-polymerization initiator. Meanwhile, as the specific example of acyl phosphine, commercial lucirin TPO, namely, 2,4,6-trimethyl-benzoyl-trimethyl phosphine oxide may be used. More various photo-polymerization initiators are well disclosed in "UV Coatings: Basics, Recent Developments and New Application (Elsevier, 2007)" written by Reinhold Schwalm, p 115, however, they are not limited to the above described examples.

The photo-polymerization initiator may be included in an amount of about 0.001% by weight to about 1.0% by weight with respect to the monomer mixture. If the concentration of the photo-polymerization initiator is too low, the polymerization rate may become low. If the concentration of the photo-polymerization initiator is too high, a molecular weight of the superabsorbent polymer may become low and its physical properties may not be uniform.

The monomer mixture may further include an additive such as a thickener, a plasticizer, a preservation stabilizer, an antioxidant, etc., if necessary.

The raw materials such as the above-described water-soluble ethylene-based unsaturated monomer, foaming agent, surfactant, foam promoter, polymerization initiator, internal crosslinking agent, and additive may be prepared in the form of being dissolved in a solvent.

In this regard, as the solvent, any solvent may be used without limitations in the constitution as long as it is able to dissolve the above ingredients, and for example, one or more selected from water, ethanol, ethylene glycol, diethylene glycol, triethylene glycol, 1,4-butanediol, propylene glycol, ethylene glycol monobutyl ether, propylene glycol monomethyl ether, propylene glycol monomethyl ether acetate, methyl ethyl ketone, acetone, methyl amyl ketone, cyclohexanone, cyclopentanone, diethylene glycol monomethyl ether, diethylene glycol ethylether, toluene, xylene, butyrolactone, carbitol, methyl cellosolve acetate, and N,N-dimethylacetamide may be used in combination.

The solvent may be included in a remaining amount excluding the above described components from the total weight of the monomer mixture.

Meanwhile, the method of forming the water-containing gel polymer by polymerization of the monomer mixture may be carried out in a reactor like a kneader equipped with agitating spindles in order to promote bubble generation.

A polymerization temperature of the monomer mixture may be controlled from about 40° C. to about 90° C., thereby effectively inducing vaporization of the volatile organic solvent and polymerization of the water-containing gel polymer in which pores are formed.

In this regard, a means for achieving the polymerization temperature within the above range is not particularly limited. Heating may be performed by providing a heating medium or by directly providing a heat source. The type of the heating medium applicable may be a hot fluid such as steam, hot air, hot oil, etc., but is not limited thereto. The temperature of the heating medium provided may be properly selected in consideration of the means of the heating medium, a heating speed, and a target temperature of heating. Meanwhile, an electric heater or a gas heater may be used as the heat source provided directly, but the heat source is not limited to these examples.

Further, a polymerization time of the monomer mixture may be controlled from 30 seconds to 10 minutes, thereby forming a water-containing gel polymer having an optimized pore structure.

As described above, the water-containing gel polymer which is discharged from the outlet of a reactor by providing a polymerization energy source such as heat to the reactor like a kneader equipped with the agitating spindles may have a size of centimeters or millimeters, according to the type of agitating spindles equipped in the reactor. Specifically, the water-containing gel polymer may be obtained in various sizes according to the concentration of the monomer mixture fed thereto, the feeding speed, etc. Generally, the water-containing gel polymer having a weight average particle size of about 2 mm to about 50 mm may be obtained.

In this regard, the water-containing gel polymer thus obtained by the method may have generally a water content of about 40% by weight to about 80% by weight. Meanwhile, the term "water content", as used herein, means a water content in the total weight of the water-containing gel polymer, which is obtained by subtracting the weight of the dry polymer from the weight of the water-containing gel polymer. Specifically, the water content is defined as a value calculated by measuring the weight loss according to evaporation of water in the polymer during the drying process of increasing the temperature of the polymer with infrared heating. In this regard, the water content is measured under the drying conditions which are determined as follows; the temperature is increased from room temperature to about 180° C. and then the temperature is maintained at 180° C., and the total drying time is determined as 20 minutes, including 5 minutes for the temperature rising step.

After crosslinking polymerization of the monomers, drying, pulverizing, and size-sorting processes may be performed to obtain the base polymer powder. Through the pulverizing and size-sorting processes, the base polymer powder and the superabsorbent polymer obtained therefrom are suitably prepared and provided such that they have a particle size of about 150 μm to about 850 μm. More specifically, at least about 95% by weight of the base polymer powder and the superabsorbent polymer obtained therefrom may have a particle size of about 150 μm to about 850 μm, and fine powder having a particle size of less than about 150 μm may be less than about 3% by weight.

As such, when particle size distributions of the base polymer powder and the superabsorbent polymer are controlled within the preferred range, the superabsorbent polymer finally prepared may exhibit excellent absorption properties.

Meanwhile, the methods of performing the drying, pulverizing, and size-sorting will be described in more detail as follows.

First, in drying the water-containing gel polymer, a coarse pulverization process may be further carried out before drying in order to increase the efficiency of the drying process, if necessary.

There is no limitation in the constitution of a milling machine to be used. Specifically, any one device selected from the group consisting of a vertical pulverizer, a turbo cutter, a turbo grinder, a rotary cutter mill, a cutter mill, a disc mill, a shred crusher, a crusher, a chopper, and a disc cutter may be used, but it is not limited thereto.

In this regard, the coarse pulverization may be carried out such that the water-containing gel polymer has a particle size of about 2 mm to about 10 mm.

Due to the high water content, it is technically not easy to pulverize the water-containing gel polymer into a particle size of less than 2 mm, and a phenomenon of agglomeration between the pulverized particles may occur. Meanwhile, when the particle size is larger than 10 mm, the effect of increasing the efficiency of the subsequent drying process may be unsatisfactory.

The water-containing gel polymer coarsely pulverized as above or the water-containing gel polymer immediately after polymerization without the coarse pulverizing step is subjected to drying. In this case, a drying temperature of the drying step may be about 50° C. to about 250° C.

When the drying temperature is lower than 50° C., it is likely that the drying time becomes too long or the physical properties of the superabsorbent polymer finally formed are deteriorated, and when the drying temperature is higher than 250° C., only the surface of the polymer is dried, and thus it is likely that fine powder is generated during the subsequent pulverizing step and the physical properties of the superabsorbent polymer finally formed are deteriorated.

Meanwhile, the drying time may be about 20 minutes or about 15 hours, in consideration of process efficiency, etc., but is not limited thereto.

The drying method of the drying step may also be selected and used without any limitation in the constitution, as long as it is a method generally used for drying the water-containing gel polymer. Specifically, the drying step may be carried out by a method such as hot air supply, infrared irradiation, microwave irradiation, or ultraviolet irradiation. When the drying step as above is finished, the water content of the polymer may be about 0.1% by weight to about 10% by weight.

Subsequently, the dried polymer obtained through the drying step is subjected to a pulverization step.

The polymer powder obtained through the pulverizing step may have a particle size of about 150 μm to about 850 μm. Specific examples of a milling machine used to achieve the above particle size may include a pin mill, a hammer mill, a screw mill, a roll mill, a disc mill, a jog mill, etc., but is not limited thereto.

Also, in order to manage the physical properties of the superabsorbent polymer powder finally commercialized after the pulverization step, a separate process of sorting the polymer powder obtained after the pulverization depending on the particle size may be performed. Preferably, a polymer having a particle size of about 150 μm to about 850 μm is sorted, and only the polymer powder having such a particle size is subjected to the surface crosslinking reaction and finally commercialized. A particle size distribution of the base polymer powder obtained through this process has been described, and a specific description thereof will be omitted.

Meanwhile, after the process of forming the above-described base polymer powder, the surface of the base polymer powder may be further crosslinked in the presence of the surface crosslinking agent to form the surface-crosslinked layer, thereby preparing the superabsorbent polymer.

The surface-crosslinked layer may be formed by using a surface crosslinking agent which has been used in the preparation of the superabsorbent polymer. As the surface crosslinking agent, any surface crosslinking agent known in the art to which the present invention pertains may be used without limitation. More specific examples thereof may include polyols such as ethylene glycol, propylene glycol, 1,4-butanediol, 1,6-hexanediol, 1,2-hexanediol, 1,3-hexanediol, 2-methyl-1,3-propanediol, 2,5-hexanediol, 2-methyl-1,3-pentanediol, 2-methyl-2,4-pentanediol, tripropylene glycol, glycerol, etc.; or carbonate-based compounds such as ethylene carbonate, propylene carbonate, etc. Such surface crosslinking agent may be used in an amount of about 0.01% by weight to 3% by weight with respect to the total weight of the base polymer powder.

In the surface crosslinking process, the surface crosslinking process may be carried out by further adding one or more inorganic materials selected from the group consisting of silica, clay, alumina, a silica-alumina composite, titania, zinc oxide, and aluminum sulfate, in addition to the surface crosslinking agent.

These inorganic materials may be used in a powdery form or in a liquid form, and in particular, alumina powder, silica-alumina powder, titania powder, or a nanosilica solution may be used. Further, the inorganic material may be used in an amount of about 0.05% by weight to about 2% by weight with respect to the total weight of the base polymer powder.

Further, in the surface crosslinking process, when the surface crosslinking is performed by adding a multivalent metal cation instead of the inorganic material or together with the inorganic material, the surface crosslinked structure of the superabsorbent polymer may be further optimized. This may be because the metal cation forms a chelate with a carboxyl group (COOH) of the superabsorbent polymer to further reduce a crosslinking distance.

There is no limitation in the method of adding the surface crosslinking agent, if necessary, the inorganic material and/or the multivalent metal cation to the base polymer powder. For example, a method of adding and mixing the surface crosslinking agent with the base polymer powder in a reactor, a method of spraying the surface crosslinking agent onto the base polymer powder, and a method of continuously mixing the base polymer powder and the surface crosslinking agent while providing them to a mixer that is continuously operated may be used.

When the surface crosslinking agent is added thereto, water and methanol may be further mixed therewith. When water and methanol are added thereto, there is an advantage that the surface crosslinking agent may be evenly dispersed in the base polymer powder. At this time, amounts of water and methanol to be added may be regulated for the purposes of inducing a uniform dispersion of the surface crosslinking agent, preventing an agglomeration phenomenon of the base polymer powder, and optimizing a surface penetration depth of the surface crosslinking agent.

The surface crosslinking reaction may be carried out by heating the base polymer powder, to which the surface crosslinking agent is applied, at about 100° C. or higher for about 20 minutes or more. Particularly, in order to prepare the superabsorbent polymer that may exhibit more excellent effects described above, the surface crosslinking process conditions may be controlled such that a maximum reaction temperature is about 100° C. to about 250° C.

The maximum reaction temperature may be maintained for about 20 minutes or more, or for about 20 minutes and 1 hour or less. Furthermore, the heat-up time from the reaction initiation temperature, for example, about 100° C. or higher, to the maximum reaction temperature may be controlled to be about 10 minutes or more, or about 10 minutes or more and 1 hour or less.

A heating means for surface crosslinking reaction is not particularly limited. The heating means used for polymerization of the monomer mixture may be used.

The superabsorbent polymer obtained by the above-described preparation method may exhibit excellent absorption rate due to the optimized absorption surface area. Further, unlike the existing knowledge that high absorption rate is incompatible with high gel strength, the superabsorbent polymer may exhibit excellent gel strength while showing a high absorption rate, thereby being excellent in all characteristics of centrifuge retention capacity, absorbency under load, liquid permeability, etc.

More specifically, the superabsorbent polymer prepared according to the preparation method of an embodiment may exhibit characteristics that centrifuge retention capacity (CRC) in a physiological saline solution is 29 g/g to 35 g/g, absorbency under load (AUL) of 0.9 psi in the physiological saline solution is 17 g/g to 21 g/g, a vortex time is 30 seconds to 50 seconds, 30 seconds to 40 seconds, or 30 seconds to 38 seconds, and absorbency under load (0.3 psi gel AUL) of the superabsorbent polymer, as measured after swelling the superabsorbent polymer in the physiological saline solution under a load of 0.3 psi for 5 minutes and removing residual liquid under vacuum, is 18 g/g to 21 g/g.

The centrifuge retention capacity (CRC) in a physiological saline solution may be measured in accordance with EDANA method WSP 241.2. More specifically, the centrifuge retention capacity may be calculated by the following Calculation Formula 1, after allowing the superabsorbent polymer to absorb the physiological saline solution over 30 minutes:

$$CRC(g/g) = \{[W_2(g) - W_1(g)]/W_0(g)\} - 1 \qquad \text{[Calculation Formula 1]}$$

wherein $W_0(g)$ is an initial weight (g) of the superabsorbent polymer, $W_1(g)$ is a weight of an apparatus, which is measured after draining water off at 250 G for 3 minutes using a centrifuge without the superabsorbent polymer, and $W_2(g)$ is the weight of the apparatus including the superabsorbent polymer, which is measured after immersing the superabsorbent polymer in 0.9 wt % physiological saline solution at room temperature for 30 minutes and draining water off at 250 G for 3 minutes using a centrifuge.

Further, the absorbency under load (AUL) of 0.9 psi may be measured in accordance with EDANA method WSP 242.2. More specifically, the absorbency under load may be calculated by the following Calculation Formula 2, after allowing the superabsorbent polymer to absorb the physiological saline solution under a load of about 0.9 psi over 1 hour:

$$AUL(g/g)=[W_4(g)-W_3(g)]/W_0(g) \qquad \text{[Calculation Formula 2]}$$

wherein $W_0(g)$ is the initial weight (g) of the superabsorbent polymer, $W_3(g)$ is the sum of the weight of the superabsorbent polymer and the weight of the apparatus capable of providing a load for the superabsorbent polymer, and $W_4(g)$ is the sum of the weight of the superabsorbent polymer after allowing the superabsorbent polymer to absorb the physiological saline solution under a load (0.9 psi) for 1 hour and the weight of the apparatus capable of providing a load for the superabsorbent polymer.

The vortex time may be measured in seconds in accordance with a method described in International Patent Application No. 1987-003208. More specifically, the vortex time may be calculated by measuring a time which is required until the vortex disappears, after adding 2 g of the superabsorbent polymer to 50 mL of a physiological saline solution and then agitating it at 600 rpm.

Lastly, absorbency under load (0.3 psi gel AUL) of the superabsorbent polymer, which is measured by swelling the superabsorbent polymer in a physiological saline solution under a load of 0.3 psi for 5 minutes and removing residual liquid under vacuum, is a factor for evaluating absorption rate under load and performances, and may be measured as follows. First, the superabsorbent polymer is allowed to absorb the physiological saline solution under a load of about 0.3 psi for 5 minutes. Then, residual liquid not absorbed into the superabsorbent polymer is removed under vacuum. In this regard, residual liquid not absorbed between the superabsorbent polymer particles is removed, and liquid absorbed by the superabsorbent polymer is not removed under vacuum. Unlike a known method of measuring absorbency under load, a method of measuring 0.3 psi gel AUL may evaluate absorbency under load of the superabsorbent polymer with more accuracy, because residual liquid existing between superabsorbent polymer particles does not influence the measurement values.

0.3 psi gel AUL of the superabsorbent polymer may be calculated by the following Calculation Formula 3:

$$0.3 \text{ psi gel AUL}(g/g)=[W_6(g)-W_5(g)]/W_0(g) \qquad \text{[Calculation Formula 3]}$$

wherein $W_0(g)$ is an initial weight (g) of the superabsorbent polymer, $W_5(g)$ is the sum of the weight of the superabsorbent polymer and the weight of the apparatus capable of providing a load for the superabsorbent polymer, and $W_6(g)$ is the sum of the weight of the superabsorbent polymer which is measured after allowing the superabsorbent polymer to absorb the physiological saline solution under a load (0.3 psi) for 5 minutes and removing residual liquid using a vacuum apparatus, and the weight of the apparatus capable of providing a load for the superabsorbent polymer.

$W_0(g)$ described in Calculation Formulae 1, 2, and 3 corresponds to the initial weight (g) before absorbing the physiological saline solution into the superabsorbent polymer, and may be the same as or different from each other.

Meanwhile, the superabsorbent polymer prepared according to the preparation method of an embodiment may exhibit a characteristic that free swell gel bed permeability (GBP) in the physiological saline solution is 50 darcy to 80 darcy.

The gel bed permeability (GBP) in the physiological saline solution may be measured in a unit of Darcy or $cm^2$ in accordance with the following method described in Patent Application No. 2014-7018005. 1 darcy means that a fluid of 1 cp viscosity flows 1 mm per sec through 1 $cm^2$ under a pressure gradient of 1 atm per 1 cm. The gel bed permeability has the same units as area, and 1 darcy is equal to $0.98692 \times 10^{-12}$ $m^2$ or $0.98692 \times 10^{-8}$ $cm^2$.

More specifically, GBP, as used herein, means a degree of penetration (or permeability) of a swollen gel layer (or bed) under what is commonly referred to as a free swell state of 0 psi (Gel Bed Permeability (GBP) Under 0 psi Swell Pressure Test), and may be measured by using an apparatus shown in FIGS. 1 to 3.

Referring to FIGS. 1 to 3, in an apparatus 500 for measuring GBP, a test apparatus assembly 528 includes a sample container 530 and a plunger 536. The plunger includes a shaft 538 having a cylinder hole bored down the longitudinal axis and a head 550 positioned at the bottom of the shaft. The shaft hole 562 has a diameter of about 16 mm. The plunger head is attached to the shaft, for example, by an adhesive. Twelve holes 544 are bored into the radial axis of the shaft, three positioned at every 90 degrees having diameters of about 6.4 mm. The shaft 538 is machined from a LEXAN rod or equivalent material and has an outer diameter of about 2.2 cm and an inner diameter of about 16 mm. The plunger head 550 has a concentric inner ring of seven holes 560 and an outer ring of 14 holes 554, all holes having a diameter of about 8.8 mm as well as a hole of about 16 mm aligned with the shaft. The plunger head 550 is machined from a LEXAN rod or equivalent material and has a height of about 16 mm and a diameter sized such that it fits within the cylinder 534 with minimum wall clearance but still slides freely. The total length of the plunger head 550 and shaft 538 is about 8.25 cm, but may be machined at the top of the shaft to obtain the desired mass of the plunger 536. The plunger 536 includes a 100 mesh stainless steel cloth screen 564 that is biaxially stretched to tautness and attached to the lower end of the plunger 536. The screen is attached to the plunger head 550 using an appropriate solvent that causes the screen to be securely adhered to the plunger head 550. Care must be taken to avoid excess solvent migrating into the open portions of the screen and reducing the open area for liquid flow. Acrylic solvent Weld-on 4 from IPS Corporation (having a place of business in Gardena, Calif., USA) may be suitably used. The sample container 530 includes a cylinder 534 and a 400 mesh stainless steel cloth screen 566 that is biaxially stretched to tautness and attached to the lower end of the cylinder 534. The screen is attached to the cylinder using an appropriate solvent that causes the screen to be securely adhered to the cylinder. Care must be taken to avoid excess solvent migrating into the open portions of the screen and reducing the open area for liquid flow. Acrylic solvent Weld-on 4 from IPS Corporation (having a place of business in Gardena, Calif., USA) may be suitably used. A gel particle sample (swollen superabsorbent polymer), indicated as 568 in FIG. 2, is supported on the screen 566 within the cylinder 534 during testing.

The cylinder 534 may be bored from a transparent LEXAN rod or equivalent material, or it may be cut from a LEXAN tubing or equivalent material, and has an inner diameter of about 6 cm (e.g., a cross-sectional area of about 28.27 cm$^2$), a wall thickness of about 0.5 cm and a height of about 7.95 cm. A step is machined into the outer diameter of the cylinder 534 such that a region 534a with an outer diameter of 66 mm exists for the bottom 31 mm of the cylinder 534. An o-ring 540 which fits the diameter of region 534a may be placed at the top of the step.

An annular weight 548 has a counter-bored hole about 2.2 cm in diameter and 1.3 cm deep so that it slips freely onto the shaft 538. The annular weight also has a thru-bore 548a of about 16 mm. The annular weight 548 may be made from stainless steel or from other suitable materials resistant to corrosion by 0.9% by weight of a physiological saline solution (sodium chloride aqueous solution). The combined weight of the plunger 536 and annular weight 548 equals about 596 g, which corresponds to a pressure applied to the sample 568 of about 0.3 psi, or about 20.7 dynes/cm$^2$ (2.07 kPa), over a sample area of about 28.27 cm$^2$.

When a test solution flows through the test apparatus during GBP testing, the sample container 530 generally rests on a weir 600. The purpose of the weir is to divert liquid that overflows the top of the sample container 530 and diverts the overflow liquid to a separate collection device 601. The weir may be positioned above a scale 602 with a beaker 603 resting on it to collect a physiological saline solution passing through the swollen sample 568.

To conduct the gel bed permeability test under "free swell" conditions, the plunger 536, with the weight 548 seated thereon, is placed in an empty sample container 530 and the height from the top of the weight 548 to the bottom of the sample container 530 is measured using a suitable gauge accurate to 0.01 mm. The force the thickness gauge applies during measurement should be as low as possible, preferably less than about 0.74 N. It is important to measure each empty sample container 530 and to keep track of which plunger 536 and weight 548 are used when using a multiple test apparatus.

Further, it is desirable that a base on which the sample container 530 is placed is level, and the top surface of the weight 548 is parallel to the bottom surface of the sample container 530. A test sample is prepared from a superabsorbent polymer to be tested for GBP. For example, a superabsorbent polymer having a particle size of about 300 μm to about 600 μm, which is prescreened through a US standard 30 mesh screen and retained on a US standard 50 mesh screen, is prepared as the test sample. About 2.0 g of the sample is placed in the sample container 530 and spread out evenly on the bottom of the sample container. The container, with 2.0 g of sample in it, without the plunger 536 and weight 548 therein, is then submerged in the 0.9% by weight of a physiological saline solution for about 60 minutes to allow the sample to swell free of any restraining load. At this time, the sample container 530 is set on a mesh located in a liquid reservoir so that the sample container 530 is raised slightly above the bottom of the liquid reservoir. The mesh does not inhibit the flow of the physiological saline solution into the sample container 530. A suitable mesh may be obtained as part number 7308 from Eagle Supply and Plastic (having a place of business in Appleton, Wis., USA). During saturation, a depth of the physiological saline solution may be controlled such that the surface within the sample container is defined solely by the sample, rather than the physiological saline solution.

At the end of this period, the plunger 536 and weight 548 assembly is placed on the saturated sample 568 in the sample container 530 and then the sample container 530, plunger 536, weight 548, and sample 568 are removed from the solution. Then, before GBP measurement, the sample container 530, plunger 536, weight 548, and sample 568 are to remain at rest for about 30 seconds on a large grid non-deformable plate of uniform thickness. The plate will prevent liquid in the sample container from being released onto a flat surface due to surface tension. The plate has an overall dimension of 7.6 cm×7.6 cm, and each grid has a size dimension of 1.59 cm long×1.59 cm wide×1.12 cm deep. A material suitable for the plate is a parabolic diffuser panel, catalogue number 1624K27, available from McMaster Carr Supply Company (having a place of business in Chicago, Ill., USA), which may then be cut to the proper dimensions.

The height from the top of the weight 548 to the bottom of the sample container 530 is measured again by using the same thickness gauge used previously, provided that the zero point is unchanged from the initial height measurement. The height measurement should be made as soon as practicable after the thickness gauge is engaged. The height measurement of the empty assembly where the plunger 536 and the weight 548 are placed in the empty sample container 530 is subtracted from the height measurement obtained after saturating the sample 568. The resulting value is the thickness or height "H" of the saturated sample 568. Further, if the plate is contained in the assembly containing the saturated sample 568, this plate must also be present when measuring the height of the empty assembly.

The GBP measurement is initiated by delivering a flow of 0.9% physiological saline solution into the sample container 530 with the saturated sample 568, plunger 536, and weight 548 inside. The flow rate of the physiological saline solution into the container is adjusted to cause the physiological saline solution to overflow the top of the cylinder 534, resulting in a consistent head pressure equal to the height of the sample container 530. The physiological saline solution may be added by any suitable means that is sufficient to ensure a small, but consistent amount of overflow from the top of the cylinder, such as with a metering pump 604. The overflow liquid is diverted into a separate collection device 601. The quantity of solution passing through the sample 568 versus time is measured gravimetrically using a scale 602 and a beaker 603. Data points from the scale 602 are collected every second for at least 60 seconds once the overflow has begun. Data collection may be taken manually or with data collection software. The flow rate, Q through the swollen sample 568 is determined in units of g/sec by a linear least-square fit of fluid (g) passing through the sample 568 versus time (sec).

GBP (cm$^2$) may be calculated from the obtained data according to the following Calculation Formula 4 to confirm gel bed permeability:

$$K=[Q*H*\mu]/[A*\rho*P] \qquad \text{[Calculation Formula 4]}$$

wherein K is gel bed permeability (cm$^2$),

Q is a flow rate (g/sec),

H is a height of swollen sample (cm),

μ is liquid viscosity (p) (viscosity of the test solution to be used in this test is about 1 cp), A is a cross-sectional area for liquid flow (28.27 cm$^2$ for the sample container used in this test), ρ is a liquid density (g/cm³) (about 1 g/cm³ for the test solution used in this test), and P is a hydrostatic pressure (dynes/cm²) (normally about 7,797 dynes/cm²).

The hydrostatic pressure is calculated from P=ρ*g*h, wherein ρ is a liquid density (g/cm³), g is gravitational acceleration (nominally 981 cm/sec²), and h is a fluid height (e.g., 7.95 cm for the GBP test described herein).

Based on the above physical properties, it was confirmed that the superabsorbent polymer prepared according to the preparation method of an embodiment may exhibit not only excellent basic absorption performances but also remarkably improved absorption rate under a pressure or under no pressure, and as a result, the superabsorbent polymer may be applied to a variety of hygiene products such as diapers, etc., thereby exhibiting very excellent overall physical properties.

Hereinafter, the actions and effects of the present invention will be described in more detail with reference to specific Examples of the present invention. However, these Examples are for illustrative purposes only, and the scope of the invention is not intended to be limited thereby.

Example 1

Preparation of Superabsorbent Polymer

A 0.2% IRGACURE 819 initiator solution diluted with acrylic acid and 5% by weight of polyethyleneglycol diacrylate (PEGDA, a molecular weight of 400) diluted with acrylic acid (solution A) were prepared. 5% by weight of trimethylolpropane triacrylate containing 9 mol % of ethylene oxide (Ethoxylated-TMPTA, TMP(EO)9TA, M-3190 Miwon Specialty Chemical Co., Ltd.) which was diluted with acrylic acid (solution B) was prepared.

Into a 2 L-volume glass reactor surrounded by a jacket in which a heating medium pre-cooled to 25° C. was circulated, 500 g of acrylic acid, 37 g of the solution A, and 14 g of the solution B were injected, and an initiator solution was injected such that the content of IRGACURE 819 became 100 ppm with respect to the total acrylic acid included in the monomer composition.

To the glass reactor, 0.005 g of OFX-0193 (XIAMETER®) as a silicone-based surfactant was added and mixed, and then 800 g of a 24% caustic soda solution (solution C) was slowly added dropwise and mixed. After confirming that the temperature of the mixed solution increased to about 72° C. or higher by neutralization heat upon adding dropwise the solution C, the mixed solution was left until it was cooled. A neutralization degree of acrylic acid in the mixed solution thus obtained was about 63 mol %.

Meanwhile, a 5% by weight of sodium bicarbonate solution diluted with water (solution D) was prepared, and 0.2 g of aluminium sulfate dissolved in 28 g of 4% sodium persulfate solution diluted with water was prepared (solution E-1).

When the temperature of the mixed solution was cooled to about 45° C., 9 g of the previously prepared solution D (sodium bicarbonate: 0.45 g) was added to and mixed with the mixed solution, and 0.5 g of acetone and the solution E-1 were added thereto and mixed therewith at the same time.

Subsequently, the above-prepared composition was subjected to light irradiation for 1 minute, and the temperature of the glass reactor was raised to 75° C. to carry out thermal polymerization for 3 minutes.

A polymer obtained by the polymerization reaction was passed through a hole having a diameter of 13 mm using a meat chopper and prepared as crumbs.

Subsequently, the crumbs were dried in an oven capable of shifting airflow up and down. The crumbs were uniformly dried by flowing hot air at 180° C. from the bottom to the top for 15 minutes and from the top to the bottom for 15 minutes such that the dried crumbs had a water content of about 2% or less.

The dried crumbs were pulverized using a pulverizer and sorted by size, and a base polymer having a size of about 150 μm to about 850 μm was obtained.

Thereafter, 100 g of the base polymer was mixed with a crosslinking agent solution which was prepared by mixing 3 g of water, 3 g of methanol, 0.4 g of ethylene carbonate, and 0.5 g of Aerosil 200 (EVONIK), and then surface crosslinking reaction was allowed at 190° C. for 30 minutes. The resulting product was pulverized and passed through a sieve to obtain a surface-crosslinked superabsorbent polymer having a particle size of 150 μm to 850 μm.

Example 2

Preparation of Superabsorbent Polymer

A surface-crosslinked superabsorbent polymer having a particle size of 150 μm to 850 μm was obtained in the same manner as in Example 1, except that the content of 5% by weight of the sodium bicarbonate solution diluted with water (solution D) was controlled to 8 g (sodium bicarbonate: 0.4 g) in Example 1.

Example 3

Preparation of Superabsorbent Polymer

A surface-crosslinked superabsorbent polymer having a particle size of 150 μm to 850 μm was obtained in the same manner as in Example 2, except that the polymer obtained by the polymerization reaction was passed through a hole having a diameter of 16 mm using a meat chopper and prepared as crumbs in Example 2.

Comparative Example 1

Preparation of Superabsorbent Polymer

A surface-crosslinked superabsorbent polymer having a particle size of 150 μm to 850 μm was obtained in the same manner as in Example 1, except that 28 g of a 4% sodium persulfate solution diluted with water (solution E-0) was injected instead of the solution E-1 in Example 1.

Comparative Example 2

Preparation of Superabsorbent Polymer

A surface-crosslinked superabsorbent polymer having a particle size of 150 μm to 850 m was obtained in the same manner as in Example 1, except that no silicone-based surfactant was added, the content of 5% by weight of the sodium bicarbonate solution diluted with water (solution D) was controlled to 6 g (sodium bicarbonate: 0.3 g), the content of acetone was controlled to 0.3 g, and 28 g of a 4% sodium persulfate solution diluted with water (solution E-0) was injected instead of the solution E-1 in Example 1.

Comparative Example 3

Preparation of Superabsorbent Polymer

A surface-crosslinked superabsorbent polymer having a particle size of 150 μm to 850 μm was obtained in the same manner as in Example 1, except that no acetone was added, and 28 g of a 4% sodium persulfate solution diluted with water (solution E-0) was injected instead of the solution E-1 in Example 1.

Experimental Example

Evaluation of Superabsorbent Polymer

Properties of the superabsorbent polymers prepared in Examples 1 to 3 and Comparative Examples 1 to 3 were evaluated as follows, and shown in the following Table 1.

(1) Centrifuge Retention Capacity (CRC)

Centrifuge retention capacity (CRC) in a physiological saline solution was measured for the superabsorbent polymers of Examples 1 to 3 and Comparative Examples 1 to 3 in accordance with EDANA method WSP 241.2.

In detail, among the superabsorbent polymers to be tested for centrifuge retention capacity, superabsorbent polymers having a particle size of 300 μm to 600 μm, which were passed through a US standard 30 mesh screen and retained on a US standard 50 mesh screen, were prepared.

The superabsorbent polymer $W_0$ (g, about 0.2 g) having a particle size of 300 μm to 600 μm was uniformly placed into a nonwoven-fabric-made bag, followed by sealing. Then, the bag was immersed into 0.9% by weight of a physiological saline solution at room temperature. 30 minutes later, the bag was drained at 250 G for 3 minutes with a centrifuge, and the weight $W_2(g)$ of the bag was then measured. Meanwhile, the same procedure was carried out using an empty bag having no superabsorbent polymer, and the resultant weight $W_1(g)$ was measured.

Each of the weights thus obtained was used to confirm centrifuge retention capacity according to the following Equation 1:

$$CRC(g/g)=\{[W_2(g)-W_1(g)]/W_0(g)\}-1 \quad \text{[Calculation Formula 1]}$$

wherein $W_0(g)$ is an initial weight (g) of the superabsorbent polymer having a particle size of 300 μm to 600 μm, $W_1(g)$ is a weight of an apparatus which is measured after draining water off at 250 G for 3 minutes with a centrifuge without using the superabsorbent polymer, and $W_2(g)$ is the weight of the apparatus including the superabsorbent polymer, which is measured after immersing the superabsorbent polymer in 0.9% by weight of the physiological saline solution at room temperature for 30 minutes and draining water off at 250 G for 3 minutes with a centrifuge.

(2) Absorbency Under Load (AUL)

Absorbency under load (AUL) of 0.9 psi in the physiological saline solution was measured for the superabsorbent polymers prepared in Examples 1 to 3 and Comparative Examples 1 to 3 according to EDANA method WSP 242.2.

In detail, a 400 mesh stainless steel screen was installed in the bottom of a plastic cylinder having an internal diameter of 25 mm. The superabsorbent polymer $W_0$ (g, 0.16 g) to be tested for absorbency under load was uniformly scattered on the screen at room temperature and humidity of 50%. Subsequently, a piston which may uniformly provide a load of 6.3 kPa (0.9 psi) was put thereon, in which an external diameter of the piston was slightly smaller than 25 mm, there was no gab between the internal wall of the cylinder and the piston, and the jig-jog of the cylinder was not interrupted. At this time, the weight $W_3(g)$ of the apparatus was measured.

After putting a glass filter having a diameter of 90 mm and a thickness of 5 mm in a petri dish having a diameter of 150 mm, 0.9% by weight of a physiological saline solution was poured in the dish until the surface level of the physiological saline solution became equal to the upper surface of the glass filter. A sheet of filter paper having a diameter of 90 mm was put on the glass filter.

Subsequently, the prepared apparatus was put on the filter paper and the superabsorbent polymer in the apparatus was allowed to swell by the physiological solution under load. After 1 hr, the weight $W_4(g)$ of the apparatus containing the swollen superabsorbent polymer was measured.

The weights thus obtained were used to calculate absorbency under load according to the following Equation 2:

$$AUL(g/g)=[W_4(g)-W_3(g)]/W_0(g) \quad \text{[Calculation Formula 2]}$$

wherein $W_0(g)$ is an initial weight (g) of the superabsorbent polymer, $W_3(g)$ is the sum of the weight of the superabsorbent polymer and the weight of the apparatus capable of providing a load for the superabsorbent polymer, and $W_4(g)$ is the sum of the weight of the superabsorbent polymer after allowing the superabsorbent polymer to absorb the physiological saline solution under a load (0.9 psi) for 1 hour, and the weight of the apparatus capable of providing the load for the superabsorbent polymer.

(3) Absorbency under load (0.3 psi gel AUL) of superabsorbent polymer measured after swelling superabsorbent polymer in physiological saline solution under load of 0.3 psi for 5 minutes and removing residual liquid under vacuum 0.3 psi gel AUL was measured for the superabsorbent polymers of Examples 1 to 3 and Comparative Examples 1 to 3 according to the following method.

In detail, a 400 mesh stainless steel screen was installed in the bottom of a plastic cylinder having an internal diameter of 25 mm. The superabsorbent polymer $W_0$ to be tested for 0.3 psi gel AUL was uniformly scattered on the screen at room temperature and humidity of 50%. Subsequently, a piston which may uniformly provide a load of 0.3 psi was put thereon, in which an external diameter of the piston was slightly smaller than 25 mm, there was no gab between the internal wall of the cylinder and the piston, and the jig-jog of the cylinder was not interrupted. At this time, the weight $W_5(g)$ of the apparatus was measured.

After putting a glass filter having a diameter of 90 mm and a thickness of 5 mm in a petri dish having a diameter of 150 mm, 0.9% by weight of a physiological saline solution was poured in the dish until the surface level of the physiological saline solution became equal to the upper surface of the glass filter. A sheet of filter paper having a diameter of 90 mm was put on the glass filter.

Subsequently, the prepared apparatus was put on the filter paper and the superabsorbent polymer in the apparatus was allowed to swell by the physiological solution under load. 5 minutes later, residual liquid was removed by using a vacuum pump. At this time, residual liquid not absorbed between the swollen superabsorbent polymer particles was removed. Then, the weight $W_6(g)$ of the apparatus including the superabsorbent polymer was measured.

0.3 psi gel AUL was calculated using the measured weight according to the following Calculation Formula 3:

$$0.3 \text{ psi gel AUL}(g/g)=[W_6(g)-W_5(g)]/W_0(g) \quad \text{[Calculation Formula 3]}$$

wherein $W_0$(g) is an initial weight (g) of the superabsorbent polymer, $W_5$(g) is the sum of the weight of the superabsorbent polymer and the weight of the apparatus capable of providing a load for the superabsorbent polymer, and $W_6$(g) is the sum of the weight of the superabsorbent polymer which is measured after allowing the superabsorbent polymer to absorb the physiological saline solution under a load (0.3 psi) for 5 minutes and removing residual liquid between the swollen superabsorbent polymer particles using a vacuum pump, and the weight of the apparatus capable of providing a load for the superabsorbent polymer.

(4) Absorption Rate (Vortex Time) of Superabsorbent Polymer

The absorption rates of the superabsorbent polymers of Examples 1 to 3 and Comparative Examples 1 to 3 were measured in seconds in accordance with a method described in International Patent Application No. 1987-003208.

In detail, the absorption rate (or vortex time) was calculated by measuring a time which was required until the vortex disappears, after adding 2 g of the superabsorbent polymer to 50 mL of a physiological saline solution and then agitating it at 600 rpm.

TABLE 1

|  | CRC [g/g] | 0.9 psi AUL [g/g] | 0.3 psi gel AUL [g/g] | Vortex time[sec] |
|---|---|---|---|---|
| Example 1 | 31.6 | 18.5 | 19.4 | 37 |
| Example 2 | 29.9 | 19.0 | 20.2 | 36 |
| Example 3 | 29.5 | 20.1 | 19.1 | 35 |
| Comparative Example 1 | 30.3 | 19.7 | 18.9 | 40 |
| Comparative Example 2 | 29.6 | 19.8 | 18.3 | 47 |
| Comparative Example 3 | 29.9 | 21.6 | 20.0 | 51 |

Referring to Table 1, it was confirmed that the preparation method according to an embodiment of the present invention may provide a superabsorbent polymer having both high absorption rate and excellent absorbency under load in various CRC regions, as shown in Examples 1 to 3.

However, it was confirmed that the existing preparation methods as in Comparative p Examples 1 to 3 may not provide a superabsorbent polymer having both excellent absorbency under load and absorption rate.

Accordingly, it was confirmed that the preparation method of an embodiment of the present invention may form a porous structure showing excellent gel strength, thereby providing a superabsorbent polymer showing excellent characteristics in all physical properties such as centrifuge retention capacity, absorbency under load, liquid permeability, etc.

REFERENCE NUMERALS

500: GBP measuring apparatus
528: Test apparatus assembly
530: Sample container
534: Cylinder
534a: Region with outer diameter of 66 mm
536: Plunger
538: Shaft
540: O-ring
544, 554, 560: Holes
548: Annular weight
548a: Thru-bore
550: Plunger head
562: Shaft hole
564: Stainless steel cloth screen of 100 mesh
566: Stainless steel cloth screen of 400 mesh
568: Sample
600: Weir
601: Collection device
602: Scale
603: Beaker
604: Metering pump

The invention claimed is:

1. A method of preparing a superabsorbent polymer, the method comprising the steps of:
    performing crosslinking polymerization of a monomer mixture to form a water-containing gel polymer, wherein the monomer mixture includes water-soluble ethylene-based unsaturated monomers having acidic groups which are at least partially neutralized, a carbonate, a volatile organic solvent, a surfactant, and a foam promoter, and wherein an internal crosslinking agent is used in the crosslinking polymerization of the monomer mixture;
    drying, pulverizing, and size-sorting the water-containing gel polymer to form a base polymer powder; and
    additionally crosslinking the surface of the base polymer powder to form a surface-crosslinked layer, wherein a surface crosslinking agent is used in the crosslinking of the surface of the base polymer powder, and
    wherein the surfactant is a silicone-based surfactant and is used in an amount of 0.00001% by weight to 0.00100% by weight with respect to a total weight of the monomer mixture,
    the foam promoter is an inorganic acid aluminum salt, and
    centrifuge retention capacity (CRC) in a physiological saline solution is 29 g/g to 35 g/g, absorbency under load (AUL) of 0.9 psi in the physiological saline solution is 17 g/g to 21 g/g, a vortex time is 30 seconds to 50 seconds, and absorbency under load of the superabsorbent polymer, as measured after swelling the superabsorbent polymer in the physiological saline solution under a load of 0.3 psi for 5 minutes and removing residual liquid under vacuum, is 18 g/g to 21 g/g.

2. The method of claim 1, wherein one or more selected from the group consisting of magnesium carbonate, calcium carbonate, sodium bicarbonate, sodium carbonate, potassium bicarbonate, and potassium carbonate are used as the carbonate.

3. The method of claim 1, wherein an organic solvent having a boiling point of 15° C. to 80° C. is used as the volatile organic solvent.

4. The method of claim 1, wherein a constitutional isomer of pentane, a constitutional isomer of hexane, acetone, methanol, ethanol, or a mixture thereof is used as the volatile organic solvent.

5. The method of claim 1, wherein the volatile organic solvent and the carbonate are used in an amount of 0.001% by weight to 0.5% by weight with respect to a total weight of the monomer mixture, respectively.

6. The method of claim 1, wherein the carbonate and the volatile organic solvent are used in a weight ratio of 1:1 to 1:2.

7. The method of claim 1, wherein the foam promoter is used in an amount of 0.001% by weight to 1% by weight with respect to a total weight of the monomer mixture.

8. The method of claim 1, wherein the monomer mixture is subjected to crosslinking polymerization in a temperature range of 40° C. to 90° C.

9. The method of claim 1, wherein one or more polyols selected from the group consisting of ethylene glycol, propylene glycol, 1,4-butanediol, 1,6-hexanediol, 1,2-hexanediol, 1,3-hexanediol, 2-methyl-1,3-propanediol, 2,5-hexanediol, 2-methyl-1,3-pentanediol, 2-methyl-2,4-pentanediol, tripropylene glycol, and glycerol; or one or more carbonate-based compounds selected from the group consisting of ethylene carbonate and propylene carbonate are used as the surface crosslinking agent.

10. The method of claim 1, wherein the surface crosslinking agent is used in an amount of 0.01% by weight to 3% by weight with respect to a total weight of the base polymer powder.

11. The method of claim 1, wherein one or more inorganic materials selected from the group consisting of silica, clay, alumina, a silica-alumina composite, titania, zinc oxide, and aluminum sulfate are used in the crosslinking of the surface of the base polymer powder.

12. The method of claim 1, wherein the surface-crosslinked layer is formed at a temperature of 100° C. to 250° C.

\* \* \* \* \*